(12) United States Patent
Farraday

(10) Patent No.: US 6,533,296 B1
(45) Date of Patent: Mar. 18, 2003

(54) SNOW BOARD SYSTEM

(76) Inventor: Eric A. Farraday, 8364 Mill Station Rd., Sebastopol, CA (US) 95472

( * ) Notice: Subject to any disclaimer, the term of this patent is extended or adjusted under 35 U.S.C. 154(b) by 0 days.

(21) Appl. No.: 09/860,334

(22) Filed: May 18, 2001

(51) Int. Cl.$^7$ .................................................. B62B 9/04
(52) U.S. Cl. ..................... 280/14.22; 280/602; 280/607; 280/610; 702/44
(58) Field of Search .............................. 280/14.22, 601, 280/610, 809, 602, 607; 702/178, 139, 176, 142, 44; 364/569; 340/870.3

(56) References Cited

U.S. PATENT DOCUMENTS

| | | |
|---|---|---|
| 3,505,878 A | 4/1970 | Moll |
| 4,546,650 A | 10/1985 | Cameron |
| 4,757,714 A | 7/1988 | Purdy et al. |
| 4,860,585 A | 8/1989 | Tuyn et al. |
| 5,003,820 A | 4/1991 | Dittbrenner |
| D359,000 S | 6/1995 | Yamamoto |
| 5,590,908 A * | 1/1997 | Carr ........................... 280/809 |
| 5,636,146 A * | 6/1997 | Flentov et al. ............... 364/569 |
| 5,721,539 A * | 2/1998 | Goetzl ...................... 340/870.3 |
| 5,878,378 A * | 3/1999 | Brommer et al. ........... 702/139 |
| 5,960,380 A * | 9/1999 | Flentov et al. ............... 702/178 |
| 6,095,547 A * | 8/2000 | Vandergrift et al. ........ 280/602 |
| 6,266,623 B1 * | 7/2001 | Vock et al. ................... 702/44 |
| 6,275,153 B1 * | 8/2001 | Brooks ..................... 340/568.6 |

FOREIGN PATENT DOCUMENTS

DE    19725904    * 12/1998    .................. 702/44

* cited by examiner

Primary Examiner—Brian L. Johnson
Assistant Examiner—Hau Phan

(57) ABSTRACT

A snow board system for measuring and displaying parametric data such as speed and distance during and after snow boarding. The snow board system includes a board member having a cavity and designed for gliding over a snow covered surface, a pair of binding assemblies designed for securing the board member to the feet of the user, a sensor device designed for determining instantaneous velocity of the board member and positioned in the cavity of the board member, and a display assembly for displaying information determined by and derived from the sensor device.

1 Claim, 1 Drawing Sheet

SNOW BOARD SYSTEM

BACKGROUND OF THE INVENTION

1. Field of the Invention

The present invention relates to snow boards and more particularly pertains to a new snow board system for measuring and displaying parametric data such as speed and distance during and after snow boarding.

2. Description of the Prior Art

The use of snow boards is known in the prior art. More specifically, snow boards heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,860,585; 4,757,714; 3,505,878; 4,546,650; U.S. Pat. No. Des. 359,000; and U.S. Pat. No. 5,003,820.

While these devices fulfill their respective, particular objectives and requirements, the aforementioned patents do not disclose a new snow board system. The inventive device includes a board member having a cavity and designed for gliding over a snow covered surface, a pair of binding assemblies designed for securing the board member to the feet of the user, a sensor means designed for determining instantaneous velocity of the board member and positioned in the cavity of the board member, and a display assembly for displaying information determined by and derived from the sensor means.

In these respects, the snow board system according to the present invention substantially departs from the conventional concepts and designs of the prior art, and in so doing provides an apparatus primarily developed for the purpose of measuring and displaying parametric data such as speed and distance during and after snow boarding.

SUMMARY OF THE INVENTION

In view of the foregoing disadvantages inherent in the known types of snow boards now present in the prior art, the present invention provides a new snow board system construction wherein the same can be utilized for measuring and displaying parametric data such as speed and distance during and after snow boarding.

The general purpose of the present invention, which will be described subsequently in greater detail, is to provide a new snow board system apparatus and method which has many of the advantages of the snow boards mentioned heretofore and many novel features that result in a new snow board system which is not anticipated, rendered obvious, suggested, or even implied by any of the prior art snow boards, either alone or in any combination thereof.

To attain this, the present invention generally comprises a board member having a cavity and designed for gliding over a snow covered surface, a pair of binding assemblies designed for securing the board member to the feet of the user, a sensor means designed for determining instantaneous velocity of the board member and positioned in the cavity of the board member, and a display assembly for displaying information determined by and derived from the sensor means.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new snow board system apparatus and method which has many of the advantages of the snow boards mentioned heretofore and many novel features that result in a new snow board system which is not anticipated, rendered obvious, suggested, or even implied by any of the prior art snow boards, either alone or in any combination thereof.

It is another object of the present invention to provide a new snow board system which may be easily and efficiently manufactured and marketed.

It is a further object of the present invention to provide a new snow board system which is of a durable and reliable construction.

An even further object of the present invention is to provide a new snow board system which is susceptible of a low cost of manufacture with regard to both materials and labor, and which accordingly is then susceptible of low prices of sale to the consuming public, thereby making such snow board system economically available to the buying public.

Still yet another object of the present invention is to provide a new snow board system which provides in the apparatuses and methods of the prior art some of the advantages thereof, while simultaneously overcoming some of the disadvantages normally associated therewith.

Still another object of the present invention is to provide a new snow board system for measuring and displaying parametric a data such as speed and distance during and after snow boarding.

Yet another object of the present invention is to provide a new snow board system which includes a board member having a cavity and designed for gliding over a snow covered surface, a pair of binding assemblies designed for securing the board member to the feet of the user, a sensor means designed for determining instantaneous velocity of the board member and positioned in the cavity of the board member, and a display assembly for displaying information determined by and derived from the sensor means.

Still yet another object of the present invention is to provide a new snow board system that enhances training by providing immediate feedback of parametric information.

Even still another object of the present invention is to provide a new snow board system that increases the competitiveness of snow-boarding by providing a means of comparison between multiple users.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
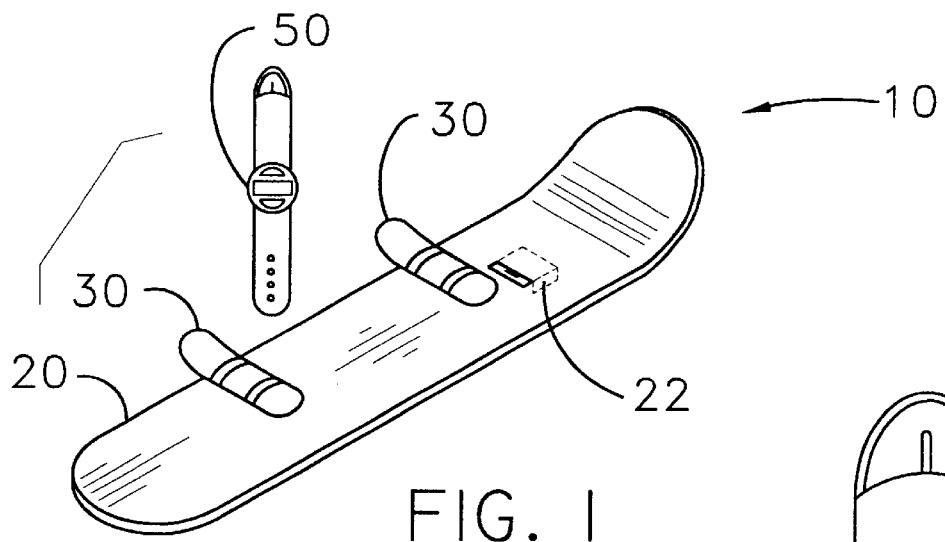
FIG. 1 is a schematic perspective view of a new snow board system according to the present invention.
Figure 2:
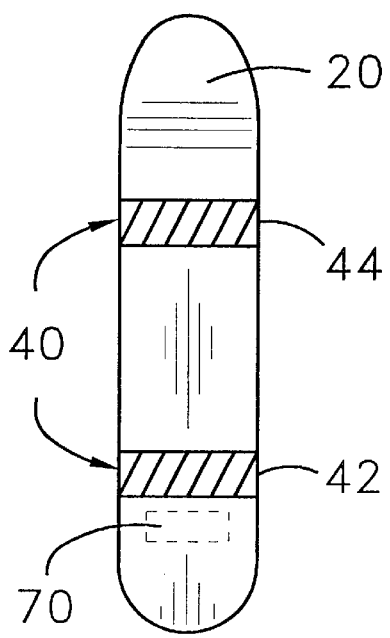
FIG. 2 is a schematic bottom view of the present invention.
Figure 3:
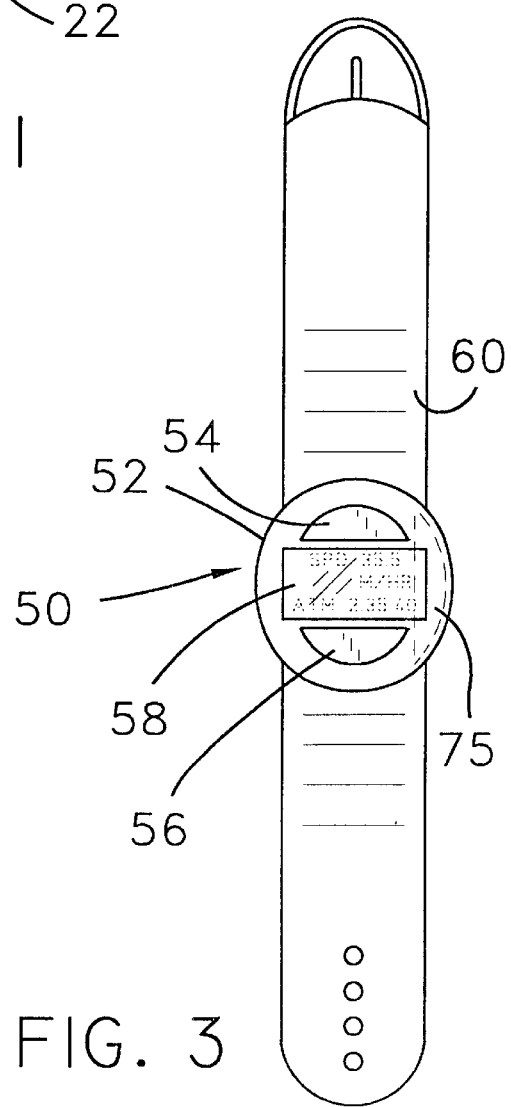
FIG. 3 is a schematic detail view of the display assembly of the present invention.

With reference now to the drawings, and in particular to FIGS. 1 through 3 thereof, a new snow board system embodying the principles and concepts of the present invention and generally designated by the reference numeral 10 will be described.

As best illustrated in FIGS. 1 through 3, the snow board system 10 generally comprises a board member 20, a pair of binding assemblies 30, a sensor means 40, and a display assembly 50.

The board member 20 is designed for gliding over a snow-covered surface. The board member 20 includes a cavity 22.

The pair of binding assemblies 30 is designed for securing the board member 20 to the feet of the user.

The sensor means 40 is designed for determining instantaneous velocity of the board member 20. The sensor means 40 is substantially positioned in the cavity 22 of the board member 20.

The display assembly 50 is for displaying information determined by and derived from the sensor means 40.

A display housing 52 is designed for being worn by a user. The display housing 52 is used to encase the display assembly 50. The display assembly 50 further comprises a display screen 58, a first 54 and second actuator button 56, and a strap member 60.

The display screen 58 is designed for providing a visual representation of parametric data including distance traveled, cumulative distance traveled, instantaneous velocity, average velocity, maximum speed, instantaneous velocity compared to average velocity, and time.

The first actuator button 54 is preferably positioned on a face of the display housing 52. The first actuator button 54 is used for selecting the parametric data to be displayed by the display screen 58.

The second actuator button 56 is positioned on a face of the display housing 52. The second actuator button 56 is used to clear selected parametric data.

The strap member 60 is coupled to the display housing 52. The strap member 60 is designed for coupling the display housing 52 to a wrist of the user.

A transmitter assembly 70 is operationally coupled to the sensor means 40. The transmitter assembly 70 is for transmitting the information from the sensor means 40.

A receiver assembly 75 is operationally coupled to the display assembly 50. The receiver assembly 75 is for receiving the transmitted information from the transmitter assembly 70. The transmitter 70 and receiver assemblies 75 provide wireless connectivity between the sensor means 40 and the display assembly 50.

In an embodiment the sensor means 40 is an accelerometer assembly positioned within the board member 20.

In a further embodiment the sensor means 40 is a piezo-electric assembly positioned substantially in the board member 40.

In still a further embodiment the sensor means 40 is an optical assembly with at least one optical sensor positioned to observe the surface as the snow board system 10 moves over the top of the surface.

In yet a further embodiment the sensor means 40 further comprises a first 42 and second sensor means 44. The first sensor means 42 is positioned adjacent to a first end of the board member 20. The first sensor means 42 is positioned substantially underneath a first one of the pair of binding assemblies 30. The second sensor means 44 is positioned adjacent to a second end of the board member 20. The second sensor means 44 is positioned substantially underneath a second one of the pair of binding assemblies 30. The first 42 and second sensor means 44 are used in conjunction to determine velocity and distance traveled by board member 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A snow board system comprising:

a board member adapted for gliding over a snow covered surface, said board member having a cavity;

a pair of binding assemblies adapted for securing said board member to the feet of the user;

sensor means adapted for determining instantaneous velocity of said board member, said sensor means comprising a pair of optical sensors positioned at longitudinally spaced locations on the lower surface of said board member, said sensor means determining the velocity of said board member through a process of calculating a time between subsequent pulses generated by each of said optical sensors caused by each of said sensors passing over the variations;

a display assembly for displaying information determined by and derived from said sensor means;

a display housing adapted for being worn by a user, said display housing being used to encase said display assembly;

said display assembly further comprises:

a display screen adapted for providing a visual representation of parametric data including distance traveled, cumulative distance traveled, instantaneous velocity, average velocity, maximum speed, instantaneous velocity compared to average velocity, and time;

a first actuator button positioned on a face of said display housing, said first actuator button being used for selecting the parametric data to be displayed by said display screen;

a second actuator button positioned on a face of said display housing, said second actuator button being used to clear selected parametric data;

a strap member coupled to said display housing, said strap member being adapted for coupling said display housing to a wrist of the user;

a transmitter assembly operationally coupled to said sensor means, said transmitter assembly being for transmitting the information from said sensor means;

a receiver assembly operationally coupled to said display assembly, said receiver assembly being for receiving the transmitted information from said transmitter assembly; and said transmitter and receiver assemblies providing a wireless connectivity between said sensor means and said display assembly;

wherein said sensor means further comprises:

a first sensor means positioned adjacent to a first end of said board member, said first sensor means being positioned substantially underneath a first one of said pair of binding assemblies;

a second sensor means positioned adjacent to a second end of said board member, said second sensor means positioned substantially underneath a second one of said pair of binding assemblies;

said first and second sensor means being used in conjunction to determine velocity and distance traveled by board member.

* * * * *